United States Patent [19]

O'Sullivan et al.

[11] 4,043,982
[45] Aug. 23, 1977

[54] PEROXIDE INITIATED POLYMERIZABLE ACRYLATE-ISOCYANATE MONOMER COMPOSITIONS

[75] Inventors: Denis J. O'Sullivan; Bernard J. Bolger; T. Eisert Casey, all of Dublin, Ireland

[73] Assignee: Loctite (Ireland) Limited, Dublin, Ireland

[21] Appl. No.: 600,384

[22] Filed: July 30, 1975

Related U.S. Application Data

[63] Continuation of Ser. No. 362,970, May 23, 1973, abandoned.

[30] Foreign Application Priority Data

May 29, 1972 Ireland .................................. 717/72

[51] Int. Cl.² .......................................... C08F 120/36
[52] U.S. Cl. .......................... 260/47 UA; 427/385 R; 428/500; 526/194; 526/217; 526/232; 526/279; 526/292; 526/304; 526/312
[58] Field of Search ....... 260/47 UA, 89.5 R, 89.5 N, 260/86.1 N, 86.1 E; 428/500; 427/385; 526/292, 312, 304, 279

[56] References Cited

U.S. PATENT DOCUMENTS

| 3,419,512 | 12/1968 | Lees et al. | 260/89.5 R |
| 3,479,328 | 11/1969 | Nordstrom | 260/86.1 N |

*Primary Examiner*—Harry Wong, Jr.
*Attorney, Agent, or Firm*—J. Rodney Reck; Jean B. Mauro

[57] ABSTRACT

This invention relates to polymerizable compositions, which serve as adhesives, sealants, potting compounds, etc., the primary components of which are an acyl peroxide initiator, an arylamine polymerization accelerator, and a polymerizable acrylate-isocyanate monomer.

9 Claims, No Drawings

PEROXIDE INITIATED POLYMERIZABLE ACRYLATE-ISOCYANATE MONOMER COMPOSITIONS

This is a continuation, of application Ser. No. 362,970 filed May 23, 1973, and now abandoned.

BACKGROUND OF THE INVENTION

There are many applications where polymerizable compositions which cured rapidly to form durable polymeric substances find substantial utility, particularly in applications involving sealing, bonding, or filling between surfaces. Rapid and reliable cure is frequently important in order to shorten the "set time," that period during which the composition must be allowed to remain at rest to permit hardening.

Of particular interest are adhesive compositions since there is a continually growing interest in the use of adhesives in today's industry to replace the more traditional and difficult to use mechanical fastenings and sealing devices. Rapid and reliable cure speed is particularly desirable to accommodate the high production rates frequently encountered in today's industries, or to minimize the storage space required for assemblies while the adhesive hardens. Naturally, the polymerized substance must be capable of bending to various surfaces, since a wide variety of bonding or sealing applications will be encountered. Other properties are beneficial, as well, as will be discussed subsequently herein.

This invention relates to a polymerizable composition which provides a substantial advance in the art of sealing and adhesive bonding due to the universality of its cure properties and its durability and other outstanding properties in the cured state. Utility is found in other applications as well, such as filling or potting of various objects or substrates.

THE INVENTION

The invention concerns compositions which harden under the influence of peroxide polymerization initiators. While these compositons can find utility in sealing, potting, filling or other related application areas, they frequently will be referred to hereafter as adhesives for simplicity, and also because the adhesive bonding is the area of prime utility. The adhesives of this composition comprise a peroxide-type polymerization initiator, and which generally is an acyl or silyl peroxide. The peroxide can be added to the balance of the composition at the time of use, but generally is used as a surface pretreating or "priming" portion, preferentially dissolved in a volatile solvent. Another principal ingredient of the polymerizable compositions is at least one acrylate-isocyanate monomer or oligomer, or a mixture of such monomers or loligomers, all of which will be hereinafter referred to for convenience as the "polymerizable monomer". The polymerizable monomer is admixed with an aryl amine polymerization accelerator, as will be more fully described hereafter.

This invention also concerns a process for sealing, filling, potting or bonding articles or assemblies, which involves priming or precoating one or more of the surfaces involved in said process with the above-described pretreating or priming agent, subsequently filling between said surfaces or substrates with the above-described mixture of polymerizable monomer and aryl amine, and allowing the polymerizable monomer to harden.

DISCUSSION OF THE INVENTION AND ITS PREFERRED EMBODIMENTS

The initiator or priming portion of the composition of this invention comprises an acyl or silyl peroxide, generally dissolved in a volatile solvent. The solvent should be sufficient volatile so that it will quickly evaporate, such as within about two minutes, and preferably within about 30 seconds, after the primer has been painted on one or more of the surfaces involved in the process.

The acyl peroxides used have the general formula

$$Ar.CO.O_2.CO.Ar \quad (1A)$$

where each Ar is an or substituted aryl radical containing up to about 10 carbon atons and preferaby is $C_6H_5$, $ClC_6H_4$, $NO_2C_6H_4$, or $Cl_2C_6H_3$. Dibenzoyl peroxide is preferred among these. This silyl peroxides have the general formula

$$CH_2=CH-Si(OOR^1)_3 \quad (1B)$$

in which $R^1$ is a $C_{1-6}$ straight or branched chain alkyl radical, a preferred silyl peroxide being vinyl tris(tert-butyl) peroxy)silane. When these initiator are used in a solvent solution, the peroxide preferably comprises from about 0.1 to 10% by weight of solution, a preferred range being 2 to 6%. Examples of solvents which generally can be used, singly or in combintions, are benzene and toluene; chlorinated and/or fluorinated hydrocarbons such as trichloromonofluoroethylane, methylene chloride, methylchloroform, trichloroethylene, and trichloroethane; lacquer-type solvents, such as acetone, ethylacetate and methylethylketone; and alcohols, such as ethanol, propanol and isopropanol. The solvent solution of active ingredients then can be applied directly to the substrate to be bonded and the solvents will evaporate, leaving a coating of the surface activator upon the substrates. Since the primer can be applied to a number of coatings or a coating of any predetermined intensity, the amounts of active ingredients dissolved in the solvent are not critical, and the general use ranges have been given previously. The preferred volatile solvent is methylene chloride.

The polymerizable monomer is selected from substances having structures which allow them to be regarded as the reaction product of an organic polyisocyanate with a polymerizable acrylate ester having a hydroxy or a primary or secondary amino group in the alcoholic moiety thereof. The active hydrogen atom in the alcoholic portion of the ester reacts with the isocyanate group, producing the polymerizable monomer used herein.

The acrylates which may be used in making the monomer are substances of the general formula

$$CH_2=CR^2. COOR^3 \quad (II)$$

in which $R^2$ is H, $CH_3$, $C_2H_5$ or Cl and $R^3$ is one of the following: (a) a $C_{1-8}$ hydroxyalkyl or aminoalkyl group, (b) a $C_{1-6}$ alkylamino-$C_{1-8}$ alkyl group; or (c) a hydroxyphenyl, an aminophenyl, a hydroxynaphthyl or an aminoaphthyl group which may be further substituted by an alkyl, alkylamino or dialkylamino group, each alkyl group in this sub-part (c) containing up to about 3 carbon atoms.

These acrylates are exemplified by, but not limited to, 2-hydroxyethyl acrylate, 2-hydroxyethyl methacrylate, 2-aminopropyl methacrylate, hydroxyhexyl acrylate, 2-tert butylaminoethyl methacrylate and hydroxyoctyl methacrylate.

In a convenient and known process for making the polymerizable monomer used in the polymerizable composition according to this invention, an acrylate of general formula II is reacted with a di- or other polyisocyanate, preferably in the presence of a solvent, at a temperature in the range of 0°–200° C as will be described in more detail later, chosen to suit the specific reactants involved.

The polyisocyanates which may be used in making the polymerizable monomer may be generally represented by the formula $(O=C=N)_nQ$, in which $n$ is an integer from 2 to about 20, preferably 2 to about 5, and Q is an organic radical having a molecular weight up to about 5000 and a bonding capacity equal to n. A preferred class of isocyanates are those of the formula $$(O=C=N)_nR^4 \qquad (III)$$

wherein $n$ is 2 and $R^4$ is a $C_{2-20}$ alkylene, alkenylene or cycloalkylene radical or a $C_{6-40}$ arylene, alkarylene, aralkylene, alkyloxyalkylene or aryloxyarylene radical which may be substituted by 1-4 chlorine atoms or by 1-3 amino or mono- or di-$C_{1-3}$—alkylamino or $C_{1-3}$ alkoxy groups.

Typical examples of such isocyanates are toluene diisocyanates, 4,4'-diphenyl diisocyanate, 4,4'-diphenyl methane diisocyanate, dianisidine diisocyanates, 1,5-naphthalene diisocyanate, 4,4'-diphenyl ether diisocyanate, p-phenylene diisocyanate, trimethylene diisocyanate, tetramethylene diisocyanate, hexamethylene diisocyanate, ethylene diisocyanate, cyclohexylene diisocyanates, nonamethylene diisocyanate, octadecamethylene diisocyanate, 2-chloropropane diisocyanate, 2,2'-diethyl-ether diisocyanate, 2-(dimethylamino) pentane diisocyanate, tetrachlorophenylene-1,4-diisocyanate, 3-heptene diisocyanate and transvinylene diisocyanate.

Other polyisocyanates which may be used are the higher molecular weight polyisocyanates obtained by reacting polyamines containing terminal primary or secondary amine groups, or polyhydric alcohols, for example, the alkane and alkene polyols such as glycerol, 1,2,6-hexanetriol, 1,5-penetenediol, ethylene glycol, polyethylene glycol, "bisphenol-A" and substituted bisphenol-A with an excess of any of the above named diisocyanates. These higher molecular weight urethane or ureide polyisocyanates may be represented by the formula:

$$(O=C=N-R^4-NH.CO.X-)_nR^5 \qquad (IV)$$

in which $R^4$ has the meaning given above; X represents O or $NR^6$ where $R^6$ is H or a $C_{1-7}$ alkyl group; and $R^5$ is the non-functional residue of a polyamine or a polyhydric alcohol having at least $n$ primary or secondary amino or hydroxyl groups respectively; and $n$ is an integer from 2 to 20.

Accordingly, when the monomer is derived from one of the simple diisocyanates defined above, it has the general formula $$(CH_2=CR^2.CO.O.R^7. O.CO.NH-)_2R^4 \qquad (V)$$

in which $R^2$ and $R^4$ have the meanings given above and $R^7$ represents $R^3$ less one hydrogen atom. Preferred monomers conforming to this definition include derivatives of higher alkylene diisocyanates such as octamethylene diisocyanate, and the aromatic diisocyanates containing more than 8 non-isocyanate-group carbon atoms, such as durene diisocyanate, i.e., tetramethylphenyl-1,4-diisocyanate, and 4,4'-diphenyl diisocyanate. When, on the other hand, the monomer is derived from one of the higher molecular weight urethane or ureide polyisocyanates aforesaid, it has the general formula $$(CH_2=CR_2.CO.O.R^7.O.CO.NH.R^4.NH.CO.X)_nR^5 \qquad (VI)$$

in which $R^2$, $R^4$, $R^5$, $R^7$, X and $n$ have the meanings given above.

As used herein, the term urethane denotes a compound having in the molecule the characteristic group —O—CO—NH— and the term ureide denotes a compound having in the molecule the characteristic group —NH—CO—NH—.

A typical and preferred monomer useful in the polymerizable composition of this formula V in which $R^2$ is $CH_3$, $R^7$ is n-$C_3H_6$ and $R^4$ is

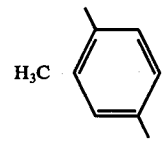

An acrylate is, as stated above, reacted with a polyisocyanate to form a monomer for use in the polymerizable composition of the invention. While the proportions of the reactants used are not critical, it is generally preferred to use about a 0.1 equivalent excess of polyisocyanate above the amount needed to furnish one isocyanate group for each hydroxyl or amino group in the acrylate molecule.

The reaction may be carried out in the presence or absence of a solvent. Preferably solvents selected from the aliphatic, cycloaliphatic and aromatic hydrocarbons, for example, benzene, toluene, cyclohexane, hexane and heptane, are employed, but other solvents such as methyl isobutyl ketone, diamyl ketone, isobutyl methacrylate, and cyclohexyl methacrylate can also be utilized if desired, especially where complete compatibility with the optical adhesive is desired. The chief reason for using a solvent is to prevent the reaction mixture from becoming too viscous.

The temperature employed in the reaction may vary over a wide range. Where the reactants are present in approximate chemically equivalent amounts or with slight excess of the isocyanate reactant, useful temperatures lie in a range extending from about 10° to 175° C.

When the simpler isocyanates are used the reactants are preferably at or near room temperature, e.g., from 20° C to 30° C. In the preparation of the high molecular weight monomers using an excess of the isocyanate, the reactants may be combined at room temperature but it is preferable to allow them to react at a temperature in the range 40° to 150° C, a specially preferred range having been found to extend from 90° to 120° C.

Reaction proceeds with a slight elevation of the temperature and is complete when heat ceases to be evolved. The reaction mixture is then cooled at room temperature; if the solvent used is suitable for incorporation in the polymerizable composition according to this invention, the reaction product will need no extraction or purification and is ready for use.

The aryl amine which is used in conjunction with the polymerizable monomer has the formula ArNR⁸R⁹ where Ar is as defined above, preferably being $C_6H_5$ or a $C_1$-$C_4$ alkyl substituted $C_6H_5$; and each of $R^8$ and $R^9$ is hydrogen or a $C_1$ to $C_4$ alkyl group. Preferably each of $R^8$ and $R^9$ is methyl or ethyl.

The aryl amine generally is used at about 0.1 to about 10% by weight of the polymerizable composition, preferably 1.0 to about 5.0%.

The polymerizable composition may of course by improved by the inclusion in the mixture of polymerizable monomer and aryl amine of one or more known additives to alter various properties of the composition in a commercially desirable fashion. Examples of such additives are latent polymerization accelerators and initiators, polymerization inhibitors, diluents, thickeners and other viscosity regulators, bond plasticizers and any other ingredients known to impart desirable properties to either the cured or uncured composition. Since the prime utility of the total composition is as an adhesive, and preferably an optical adhesive, it is preferred that the additives do not detract from the desired optical transparency and refractive index range of the composition. The desired refractive index range is 1.3 to 1.8, preferably 1.47 to 1.56.

Particularly preferred additives are the organic hydroperoxides, latent polymerization initiators which act as a supplementary free radical source to aid in cure of the polymerizable compositions. Hydroperoxides are commonly used at a level of about 0.5 - 5% by weight of the polymerizable composition. Other optional additives are tertiary amines, amides and imides and other known organic compounds which act as polymerization accelerators; quinones such as benzoquinone, hydroquinone and 1,4-naphthoquinone which act as inhibitors of spurious polymerization and thus extend the shelf life of the optical adhesives of the invention. These additives are generally employed in proportions lower than 10% by weight of composition. In the case of polymerization inhibitors the proportion is usually from 10 to 1000 parts per million by weight of composition.

Suitable composition diluents are themselves monomeric acrylates, capable of polymerization, and of low viscosity compared with the polymerizable monomers herein described as essential components of the invention. Typical of such monomeric acrylates are cyclohexyl methacrylate, tetrahydrofurfuryl methacrylate, hydroxypropyl methacrylate, all of which will themselves polymerize, when stimulated by the incipient polymerization of the main monomer, and will not adversely affect the transparency or refractive index of the polymer produced.

The polymerizable portion of the polymerizable compositions prepared as described above may be handled at room temperature and if protected from ultraviolet radiation by packing in suitable containers, may be stored for long periods without noticeably thickening or gelling. The shelf-stability of this polymerizable portion may be determined by a simple test. This entails maintaining a small amount of the polymerizable portion in a test tube at 82° C. ± 1° and checking the liquid at various intervals for gellation. The "stability" is taken as that point in time when first gellation is noted. A stability of 60 minutes or greater at that temperature is indicative of approximately two year's minimum shelf stability at ambient temperature.

In use, the priming portion of the composition is applied to at least one, and preferably all, of the surfaces of the substrate which are to be contacted with polymerizable composition. A plurality of coats may be used, and the solvent, if any, is allowed to evaporate. Thereafter the polymerizable portion is placed between the surfaces of the substrate, in contact with the peroxide of the priming portion, and cure allowed to proceed. When used as an adhesive, usable bonds are generated rapidly, generally within 50 to 60 seconds. The properties of the adhesive are excellent, providing a refractive index very similar to glass. They are hard and durable with good adhesion to most surfaces, and are not subject to excessive shrinkage. They serve, therefore, as excellent glass bending adhesives, even in optical assemblies, potting compounds, and in other applications as has been described herein.

EXAMPLES

The invention will be illustrated by reference to the following description of specific embodiments thereof, given by way of non-limiting example only. All weights and ratios are given on a weight basis, unless specifically stated to the contrary.

The monomers A and B referred to in the Examples will be first described. Monomer A is the reaction product of 2 moles of 3-hydroxypropyl methacrylate with one mole of the reaction product of one mole of hydrogenated bisphenol A (4,4'-Dicyclohexanoyl dimethyl methane) and two moles of toluene-2,4-diisocyanate. It is believed to have the formula

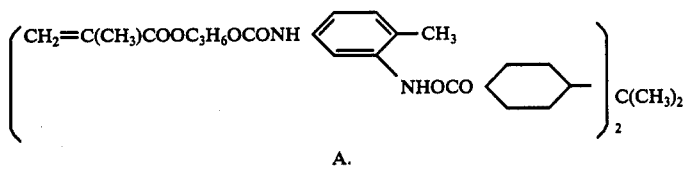

A.

Monomer B is the reaction product of 3 moles of hydroxyethyl methacrylate with one mole of the reaction product of polypropylene triol (average molecular weight 2500) and three moles of toluene diisocyanate. It is believed to have the formula

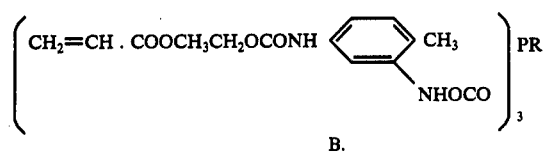

B.

where PR represents the residue of the propylenetriol oligomer. Each of these monomers can be prepared by a known process as outlined above.

EXAMPLES

EXAMPLE 1

An optical adhesive composition was prepared, in the following two parts:

| Part I (Primer Portion) | |
|---|---|
| Ingredient | Parts By Weight |
| Dibenzoyl peroxide | 5 |
| Methylene Chloride | 95 |
| Part II (Polymerizable Portion) | |
| Monomer A | 43 |
| Monomer B | 24 |
| Acrylic acid | 3.0 |
| Methacryloxy trimethoxy silane | 1.0 |
| N,N-dimethyl p-toluidine | 1.5 |
| Hydroxypropyl methacrylate q.s. ad | 100 |

Of a pair of clean flat glass surfaces to be bonded, one was painted with the above-described primer portion, and when the solvent had evaporated, both surfaces were painted with the above-described polymerizable portion, following which the surfaces were pressed together. Within one minute an acceptably strong, colorless, transparent bond had been formed having refractive index of 1.54.

EXAMPLE II

The test of Example I was repeated using essentially the same compositions as described therein, except that the dibenzoyl peroxide of the primer portion was replaced by an equivalent amount of vinyl-tris(t-butyl peroxy) silane. Substantially similar results were obtained as those described in the adhesive bonding tests of Example I.

EXAMPLE III

When, in Example I, the dibenzoyl peroxide is replaced by an equivalent amount of di(chlorobenzoyl) peroxide, di(nitrobenzoyl) peroxide or di(dichlorobenzyl) peroxide, substantially similar results are obtained as those described in the adhesive bonding tests of Example I.

We claim:

1. A polymerizable composition which comprises a first part consisting essentially of a diacyl peroxide of the formula $Ar.CO.O_2CO.Ar$ wherein each Ar is an aryl or substituted aryl radical containing up to about 10 carbon atoms, or a silyl peroxide of the formula $CH_2=CHSi(OOR^1)_3$ wherein each $R^1$ is a $C_1$ to $C_6$ alkyl radical; and a second part consisting essentially of a free radical polymerizable monomer which is made by reacting at a temperature of 0°–200° C an organic polyisocyanate with a polymerizable acrylate ester having a reactive hydrogen atom in a hydroxy or a primary or secondary amino group in the alcoholic moiety of said ester, each such hydrogen atom having reacted with an isocyanate group, said polyisocyanate having the formula $$(O=C=N)_nR^4$$

wherein n is 2 and $R^4$ is a $C_{2-20}$ alkylene, alkenylene or cycloalkylene radical or a $C_{6-40}$ arylene, alkarylene, aralkylene, alkyloxyalkylene or aryloxyarylene radical which may be substituted by 1-4 chlorine atoms or by 1-3 amino or mono- or di-$C_{1-3}$-alkylamino or $C_{1-3}$ alkoxy groups, and about 0.1 to about 10 percent by weight of the second part of an aryl amine polymerization accelerator of the formula $ArNR^8R^9$ wherein Ar is as defined above and each $R^8$ and $R^9$ is a hydrogen or a $C_1$ to $C_4$ alkyl group.

2. The composition of claim 1 wherein the peroxide is a diacyl peroxide wherein each Ar group is selected from the group consisting of $C_6H_5$, $ClC_6H_4$, $NO_2C_6H_4$, or $Cl_2C_6H_3$.

3. The composition of claim 1 where, in the aryl amine, Ar is $C_6H_5$ or a $C_1$ to $C_4$ alkyl substituted $C_6H_5$, and each and $R^8$ and $R^9$ is methyl or ethyl.

4. An adhesive which comprises a primer portion consisting essentially of a volatile organic solvent containing from about 0.1 to about 10 percent by weight of an acyl peroxide of the formula $Ar.CO.O_2.CO.Ar$ wherein each Ar is an aryl or substituted aryl radical containing up to about 10 carbon atoms, or a silyl peroxide of the formula $CH_2=CH-Si(OOR^1)_3$ wherein each $R^1$ is a $C_1$ to $C_6$ alkyl radical, and a polymerizable portion consisting essentially of a free radical polymerizable monomer which is made by reacting at a temperature of 0°–200° C an organic polyisocyanate with a polymerizable acrylate ester having a reactive hydrogen atom in a hydroxy or a primary or secondary amino group in the alcoholic moiety of said ester, each such hydrogen atom having reacted with an isocyanate group, said polyisocyanate having the formula $$(O=C=N)_nR^4$$

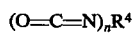

wherein n is 2 and $R^4$ is a $C_{2-20}$ alkylene, alkenylene or cycloalkylene radical or a $C_{6-40}$ arylene, alkarylene, aralkylene, alkyloxyalkylene or aryloxyarylene radical which may be substituted by 1-4 chlorine atoms or by 1-3 amino or mono- or di-$C_{1-3}$-alkylamino or $C_{1-3}$ alkoxy groups, and from about 0.1 percent to about 10 percent by weight of the polymerizable portion of an aryl amine of the formula $ArNR^8R^9$ wherein Ar is as defined above and each of $R^8$ and $R^9$ is a hydrogen or a $C_1$ to $C_4$ alkyl group.

5. The adhesive composition of claim 4 wherein the peroxide is a diacyl peroxide wherein each Ar group is selected from the group consisting of $C_6H_5$, $ClC_6H_4$, $NO_2C_6H_4$, or $Cl_2C_6H_3$.

6. The adhesive composition of claim 4 where, in the aryl amine, Ar is $C_6H_5$ or a $C_1$ to $C_4$ alkyl substituted $C_6H_5$, and each of $R^8$ and $R^9$ is methyl or ethyl.

7. The process of bonding substrates which comprises applying to at least one of said substrates a solution in a volatile organic solvent of about 0.1 to about 10 percent by weight of an acyl peroxide of the formula $Ar.CO.O_2.CO.Ar$ wherein each Ar is an aryl or substituted aryl radical containing up to about 10 carbon atoms, or a silyl peroxide of the formula $CH_2=CH-Si(OOR^1)_3$ wherein each $R^1$ is a $C_1$ to $C_6$ alkyl radical; allowing said volatile organic solvent to evaporate; applying to at least one of said substrates a polymerizable mixture comprising from about 90 to about 99.9 percent by weight of the polymerizable mixture of a polymerizable monomer which is made by reacting at a temperature of 0°–200° C an organic polyisocyanate with a polymerizable acrylate ester having a reactive hydrogen atom in a hydroxy or a primary or secondary amino group in the alcoholic moiety of said ester, each such hydrogen atom having reacted with an isocyanate group, said polyisocyanate having the formula $$(O=C=N)_nR^4$$

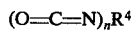

wherein $n$ is 2 and $R^4$ is a $C_{2-20}$ alkylene, alkenylene or cycloalkylene radical or a $C_{6-40}$ arylene, alkarylene, aralkylene, alkyloxyalkylene or aryloxyarylene radical which may be substituted by 1–4 chlorine atoms or by 1–3 amino or mono- or di-$C_{1-3}$-alkylamino or $C_{1-3}$ alkoxy groups, and from about 0.1 percent to about 10 percent by weight of the polymerizable mixture of an aryl amine of the formula $ArNR^8R^9$ wherein Ar is as defined above and each of $R^8$ and $R^9$ is a hydrogen or a $C_1$ to $C_4$ alkyl group; and allowing said polymerizable portion to harden under the influence of the peroxide to bond said substrates.

8. The process of claim 7 wherein the peroxide is a diacyl peroxide wherein each Ar group is selected from the group consisting of $C_6H_5$, $ClC_6H_4$, $NO_2C_6H_4$, or $Cl_2C_6H_3$.

9. The process of claim 7 where, in the aryl amine, Ar is $C_6H_5$ or a $C_1$ to $C_4$ alkyl substituted $C_6H_5$, and each of $R^8$ and $R^9$ is methyl or ethyl.

* * * * *

UNITED STATES PATENT OFFICE
CERTIFICATE OF CORRECTION

Patent No. 4,043,982   Dated August 23, 1977

Inventor(s) Denis J. O'Sullivan, Bernard J. Bolger & T. Eisert Casey

It is certified that error appears in the above-identified patent and that said Letters Patent are hereby corrected as shown below:

At Column 1, Line 26:  Delete "bending" and insert "bonding."

At Column 1, Line 55:  Delete "loligomers" and insert "oligomers."

At Column 1, Line 64:  Delete "fillng" and insert "filling."

At Column 2, Line 24:  Remove the parenthesis after butyl.

At Column 2, Line 31:  Delete "trichloromonofluoroethylane" and insert "trichloromonofluoroethane."

At Column 2, Line 40:  Delete "to" and insert "in."

At Column 3, Line 46:  Insert quotation marks around bisphenol-A.

At Column 5, Line 11:  Delete "by" and insert "be."

At Column 5, Line 14:  Insert the word "designed" after additives.

At Column 6, Line 17:  Delete "50" and insert "30."

At Column 6, Line 22:  Delete "bending" and insert "bonding."

At Column 6, Line 36:  Delete "'Dicyclohexanoyl" and insert "-Dicyclohexanolyl."

UNITED STATES PATENT OFFICE
CERTIFICATE OF CORRECTION

Patent No. 4,043,982    Dated August 23, 1977

Inventor(s) Denis J. O'Sullivan, Bernard J. Bolger & T. Eisert Casey

It is certified that error appears in the above-identified patent and that said Letters Patent are hereby corrected as shown below:

At Column 8, Line 9: Delete the "and" after "each" and insert "of."

Signed and Sealed this

Sixth Day of July 1982

[SEAL]

Attest:

Attesting Officer

GERALD J. MOSSINGHOFF

Commissioner of Patents and Trademarks